(12) United States Patent
Smolik et al.

(10) Patent No.: US 10,906,469 B2
(45) Date of Patent: Feb. 2, 2021

(54) VEHICLE CONSOLE ASSEMBLY

(71) Applicant: Nissan North America, Inc., Franklin, TN (US)

(72) Inventors: David Smolik, Windsor (CA); Michael McDuffie, West Bloomfield Township, MI (US)

(73) Assignee: Nissan North America, Inc., Franklin, TN (US)

( * ) Notice: Subject to any disclaimer, the term of this patent is extended or adjusted under 35 U.S.C. 154(b) by 91 days.

(21) Appl. No.: 16/263,674

(22) Filed: Jan. 31, 2019

(65) Prior Publication Data

US 2020/0247323 A1     Aug. 6, 2020

(51) Int. Cl.
*B60R 7/04* (2006.01)
*B60N 2/75* (2018.01)
*B60R 11/00* (2006.01)

(52) U.S. Cl.
CPC ............. *B60R 7/04* (2013.01); *B60N 2/793* (2018.02); *B60R 2011/0007* (2013.01)

(58) Field of Classification Search
CPC ............. B60R 7/04; B60R 2011/007; B60N 2011/0007
See application file for complete search history.

(56) References Cited

U.S. PATENT DOCUMENTS

| | | | |
|---|---|---|---|
| 2,698,125 A * | 12/1954 | Vizcarrondo | B65D 5/48018 229/117.14 |
| 7,566,984 B2 | 7/2009 | Blanchard | |
| 7,931,322 B2 | 4/2011 | O'Brien et al. | |
| 8,556,320 B2 | 10/2013 | Yamagishi et al. | |
| 9,975,493 B2 | 5/2018 | Okinaga et al. | |
| 10,029,620 B1 * | 7/2018 | Huebner | B60N 3/107 |
| 2010/0013256 A1 | 1/2010 | Arndt et al. | |
| 2010/0123328 A1 * | 5/2010 | Sluis | B60R 7/04 296/37.8 |
| 2011/0215607 A1 | 9/2011 | Beyer et al. | |
| 2012/0242200 A1 * | 9/2012 | Keragala | F16B 12/14 312/111 |
| 2015/0035308 A1 * | 2/2015 | Huebner | B60R 11/0252 296/37.8 |
| 2016/0257255 A1 * | 9/2016 | Gaudig | B60R 7/04 |
| 2019/0092243 A1 * | 3/2019 | Perez | B60R 11/02 |
| 2019/0135187 A1 * | 5/2019 | Munro | B60N 3/102 |

FOREIGN PATENT DOCUMENTS

| | | | | |
|---|---|---|---|---|
| DE | 19633913 A1 * | 2/1998 | | B60R 7/04 |
| DE | 10322299 A1 * | 12/2004 | | B60R 7/088 |

* cited by examiner

*Primary Examiner* — Lori L Lyjak
(74) *Attorney, Agent, or Firm* — Global IP Counselors, LLP

(57) ABSTRACT

A vehicle console assembly includes a console box and an insert. The console box is for a vehicle center console. The insert is removably disposed in a storage compartment of the console box and has a bottommost panel that is supported on a bottommost panel of the console box.

19 Claims, 7 Drawing Sheets

VEHICLE CONSOLE ASSEMBLY

BACKGROUND

Field of the Invention

The present invention generally relates to vehicle console assembly. More specifically, the present invention relates to vehicle console assembly for a center console of a vehicle.

Background Information

Many vehicles include different types of storage spaces and depositing compartments for storing items. Vehicle storage compartments can be provided in the doors or as a glove compartment for receiving diverse objects. Alternatively, storage compartments can be contained in a center console underneath the armrest. Center consoles can also include a wide variety of storage compartments and cup-holders.

SUMMARY

It has been discovered that vehicle storage compartments can contain one or more inserts or organizers for storing objects in the storage compartments.

In view of the state of the known technology, one aspect of the present disclosure is to provide a vehicle console assembly having a console box and an insert. The console box is for a vehicle center console. The insert is removably disposed in a storage compartment of the console box and has a bottommost panel that is supported on a bottommost panel of the console box.

In view of the state of the known technology, another aspect of the present disclosure is to provide a vehicle console box insert configured to be removably disposed into a storage compartment of a vehicle console box. The insert comprises a first compartment and a second compartment. The first compartment has a maximum depth of the insert. The second compartment has a depth that is less than the maximum depth of the insert.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
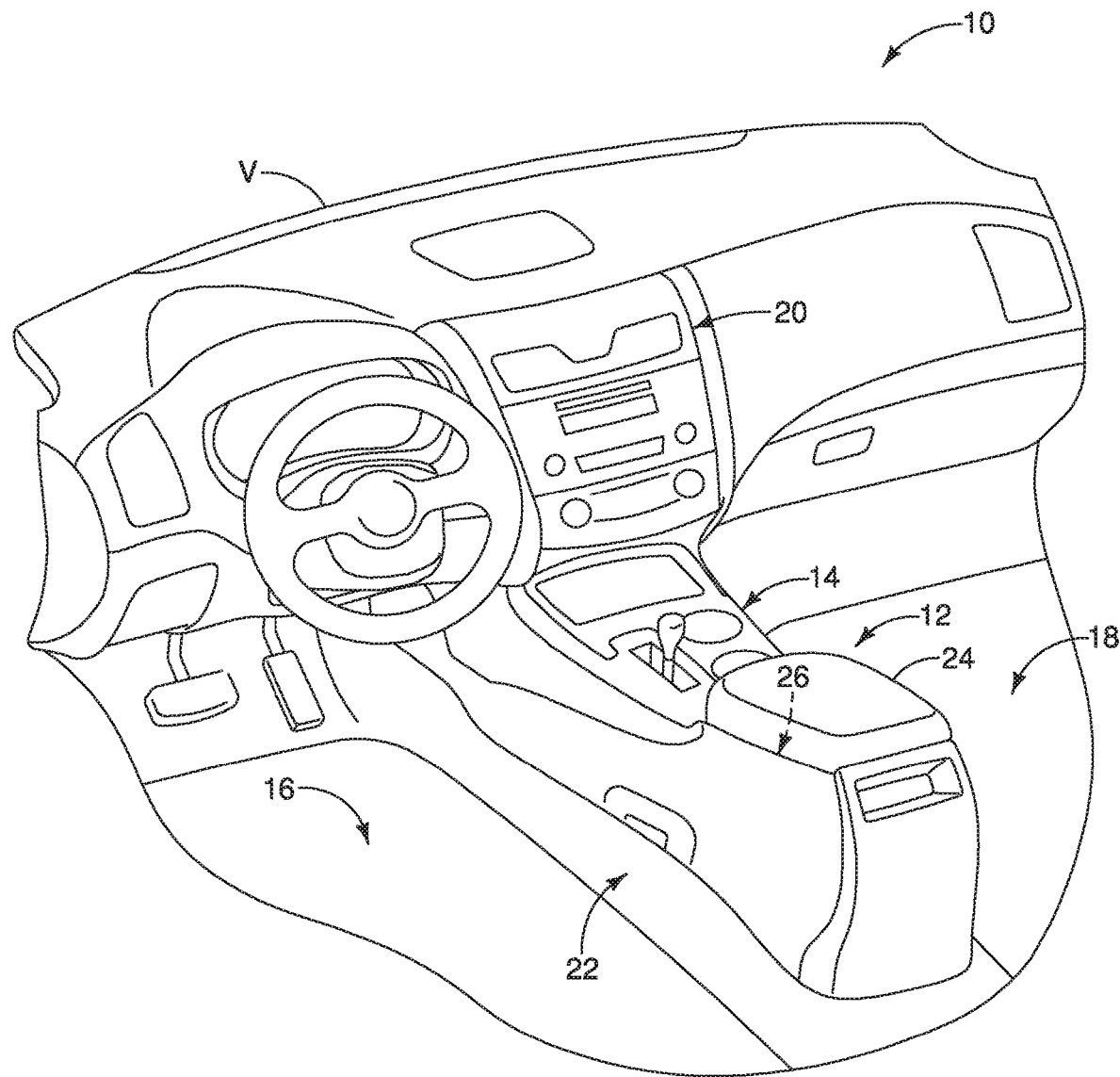
FIG. 1 is a view of a vehicle passenger compartment equipped with a center console having a vehicle console assembly in accordance with an illustrated embodiment.
Figure 2:
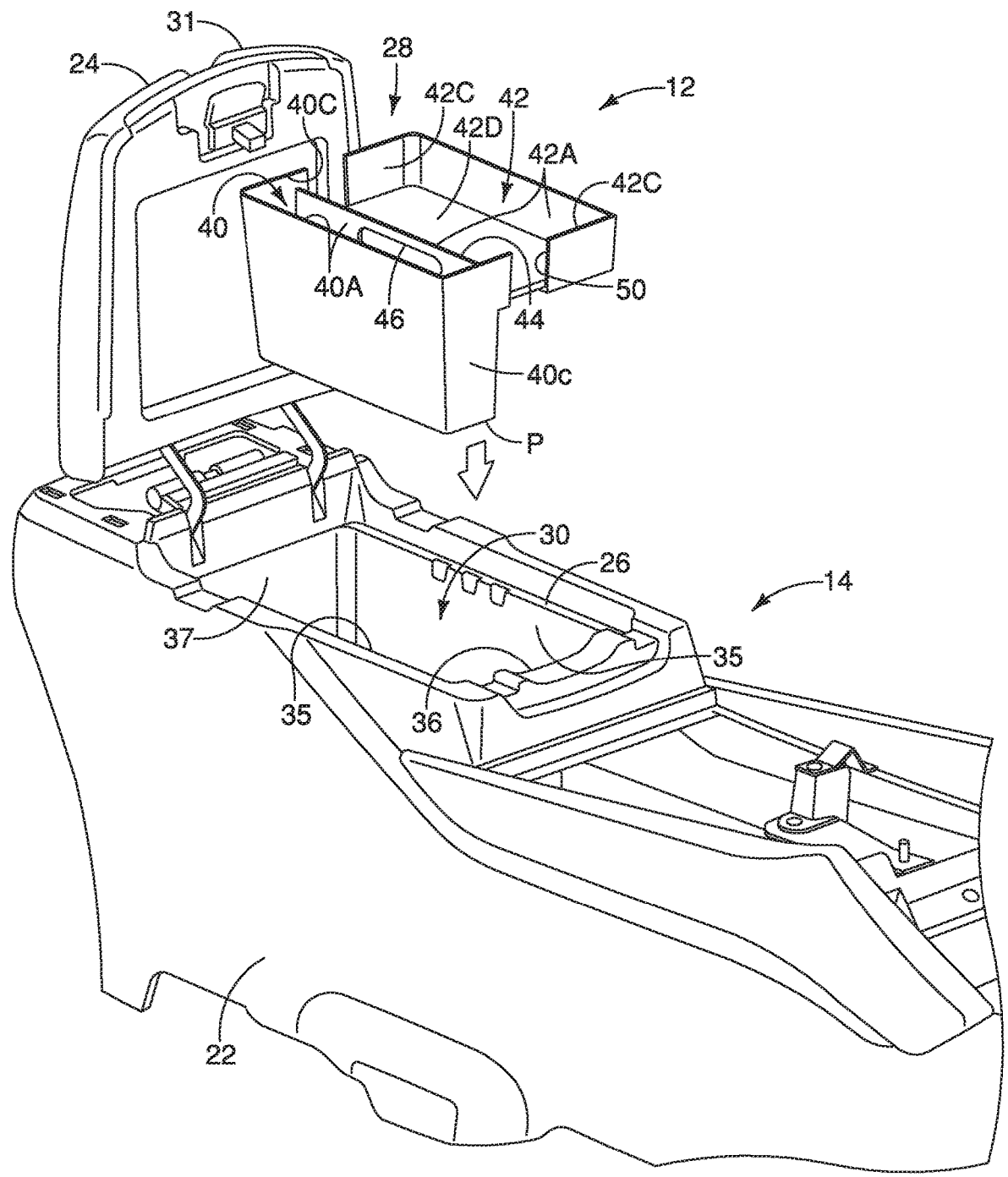
FIG. 2 is a front perspective view of the center console of FIG. 1 with the lid opened to show a console box having a storage compartment and an insert configured to be disposed therein.

Referring now to FIGS. 1 and 2, a passenger compartment 10 of a vehicle V is illustrated having a vehicle console assembly 12 in accordance with an illustrated embodiment. The vehicle console assembly 12 is configured to be implemented with a vehicle center console 14 that is disposed between an area having the driver's seat 16 and an area having the front passenger seat 18. The center console 14 is a control-bearing apparatus located a center and front location of the passenger compartment 10. In the illustrated embodiment, the center console 14 extends from a dashboard 20 and is disposed over a transmission tunnel 22 which runs between the areas having the driver's and the front passenger's seats 16 and 18. In the illustrated embodiment, the center console 14 can serve as an armrest 24 between the driver's and passenger's seats 16 and 18. The center console 14 includes one or more storage compartments located under the armrest 24.

As shown in FIG. 2, the vehicle console assembly 12 further comprises a console box 26 and an insert 28 that is implemented with the console box 26. The console box 26 is for the vehicle center console 14. The insert 28 is configured to be disposed within a storage compartment 30 of the console box 26 to store and organize objects inside the console box 26. Here, the console box 26 has the storage compartment 30 of the center console 14. In the illustrated embodiment, the console box 26 and the insert 28 can be considered accessories of the vehicle V. In particular, the console box 26 and the insert 28 can both be provided as aftermarket items that are implemented with a vehicle center console 14. Thus, either the center console 14 and the console box 26 can be considered an accessory receiving body in that the center console 14 can receive the console box 26 as an accessory, and that the console box 26 can receive the insert 28 as an accessory.

Figure 3:
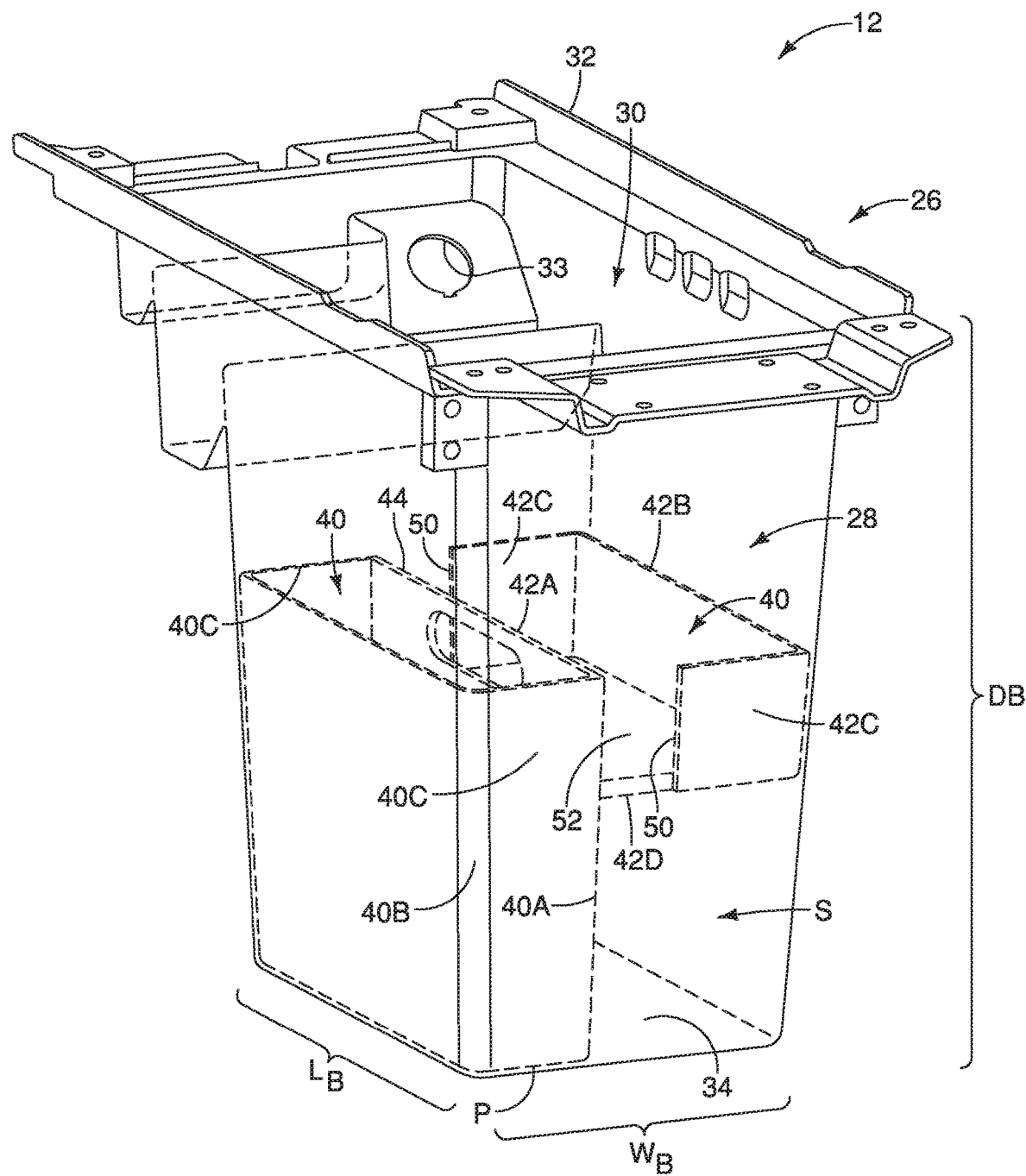
FIG. 3 is a rear perspective view of the vehicle console assembly having the console box and the insert disposed therein a first orientation.
Figure 4:
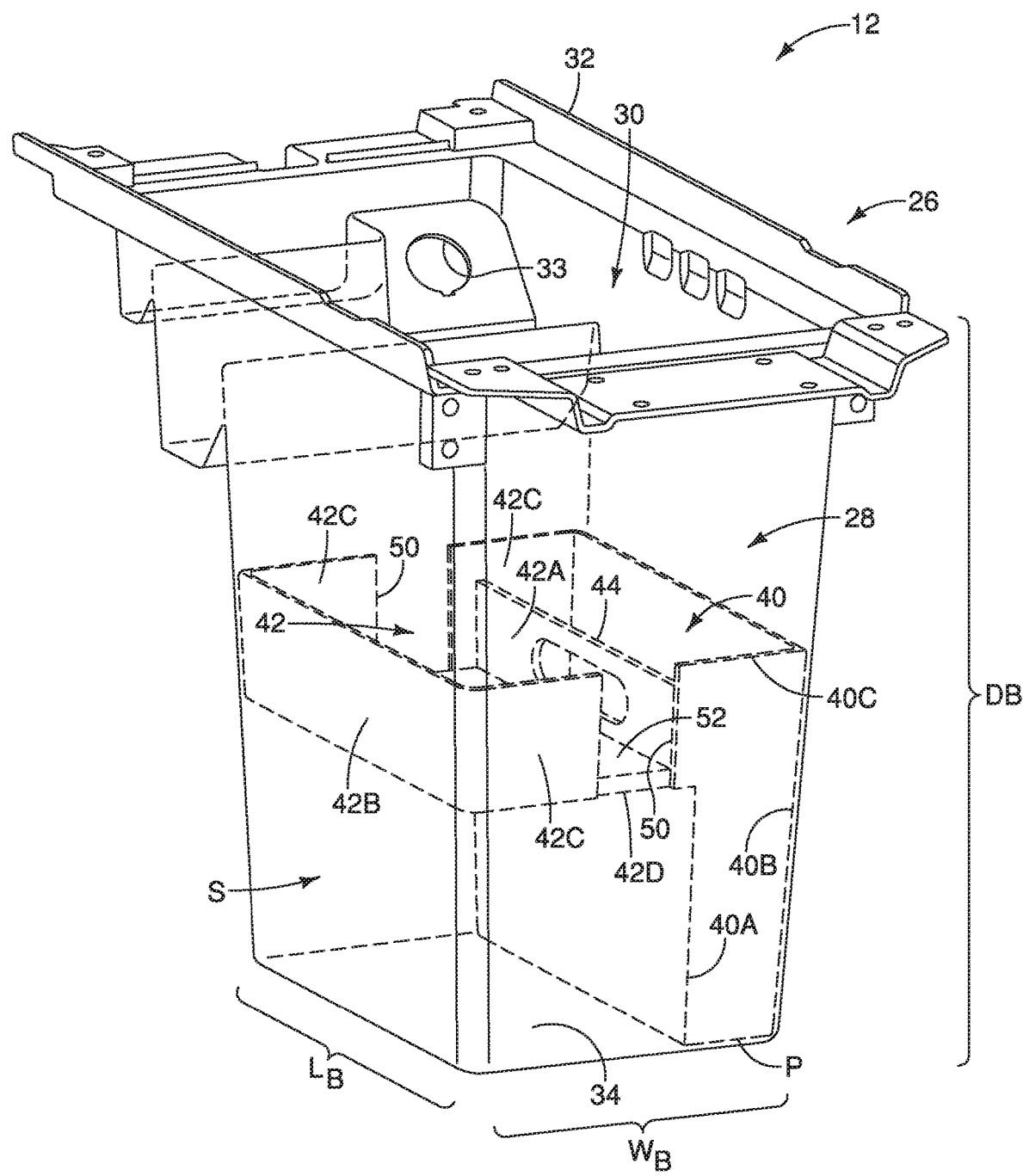
FIG. 4 is a rear perspective view of the vehicle console assembly having the console box and the insert disposed therein a second orientation.

Referring to FIGS. 2 to 4, the console box 26 includes a lid 31 pivotable about a hinge to open and enclose the storage compartment 30 of the console box 26. The lid 31 can serve as the armrest 24 of the center console 14. The console box 26 can include a plurality of retaining structures 32 that mount and secure the console box 26 to the center console 14 in a conventional manner. The retaining structures 32 are not important to the practice of the invention and therefore will not be further discussed herein.

As best seen in FIGS. 3 and 4, the console box 26 preferably includes an opening 33 for a power outlet (not shown) disposed at a forward end of the console box 26. The power outlet can be electrically connected to an ignition unit having a DC connector to supply electrical power (e.g., direct current power) for portable electrical accessories used in the vehicle V. In particular, the power outlet can supply electrical power to electrical accessories stored in the console box 26, which will be further discussed below.

Figure 5:
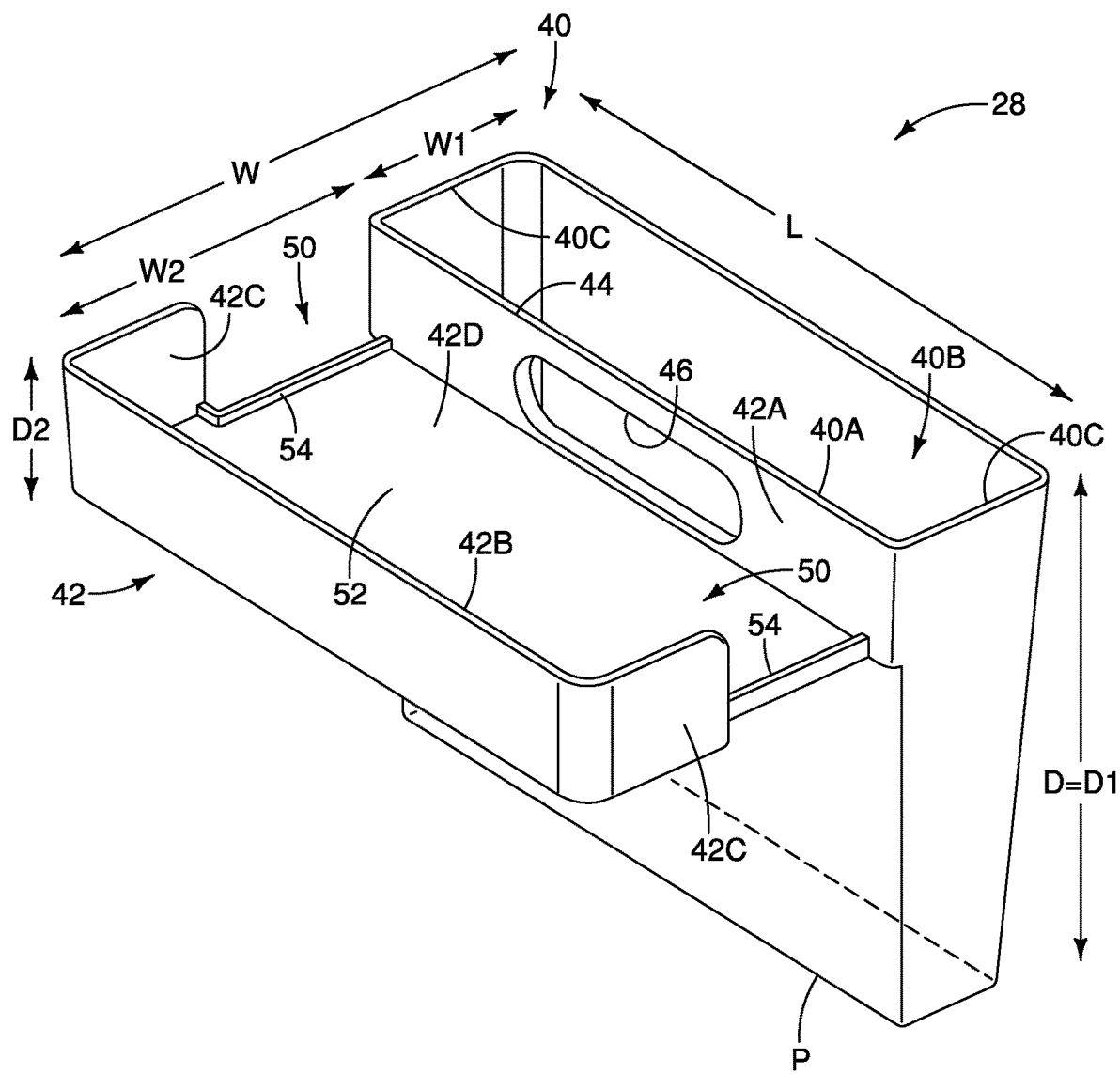
FIG. 5 is a top perspective view of the insert.

Referring to FIGS. 4 and 5, the console box 26 includes a bottommost panel (e.g., a floor 34), a pair of sidewalls 35 that separate a forward wall 36 and a rearward wall 37. The floor 34 and the walls 35, 36 and 37 together define the storage compartment 30 of the console box 26. The forward wall 36 is disposed car forward with respect to the rearward wall 37. As shown, the storage compartment 30 is illustrated as having a rectangular shape. However, it will be apparent to those skilled in the vehicle field from this disclosure that the shape of the console box 26 can be modified and/or changed to practice the claimed invention.

Conventionally, console boxes are provided as having one primary compartment which may be difficult to organize items for storage, especially smaller items such as coins or wires. Some console boxes can be provided with a storage tray that sits on a top edge of the console box 26 to organize smaller objects. However, such trays may encumber access to the compartment underneath. Thus, the insert 28 of the illustrated embodiment is provided to store and organize smaller and larger objects in the console box 26, and is readily removable from the console box 26 for ease of cleaning. In particular, the insert 28 of the illustrated embodiment is provided for multi-layered storage. Thus, the insert 28 includes a first compartment 40 and a second compartment 42 having different dimensions. Specifically, the first and second compartments 40 and 42 have different depths configured to store items of different sizes and shapes. In the illustrated embodiment, the second compartment 42 has an overall depth D2 that is less than a maximum depth D1 of the first compartment 40. Therefore, the overall depth D2 of the second compartment 42 is less than a maximum depth D of the insert 28.

In the illustrated embodiment, as best seen in FIGS. 3 and 4, the maximum depth D of the insert 28 is less than a maximum depth DB of the console box 26. Preferably, the maximum depth D of the insert 28 is one-third to one-half of the maximum depth DB of the console box 26. More preferably, the maximum depth D of the insert 28 is approximately one-half of the maximum depth DB of the console box 26. In this disclosure, the term "maximum depth" is defined as the greatest total dimension of a described component measured in a direction corresponding to a vehicle height direction.

In particular, in the illustrated embodiment, the maximum depth D of the insert 28 ranges from approximately 125 millimeters to 145 millimeters. More preferably, the maximum depth D of the insert 28 ranges from approximately 130 millimeters to 140 millimeters. Most preferably, the maximum depth D of the insert 28 is approximately 135 millimeters. It will be apparent to those skilled in the vehicle field from this disclosure that the maximum depth of the insert 28 can vary depending on the overall depth of the console box 26 and/or the center console 14.

As shown, the insert 28 has a bottommost panel P that is supported on the floor 34 of the console box 26. In other words, the insert 28 of the illustrated embodiment is configured to be disposed inside the storage compartment 30 of the console box 26 such that the insert 28 occupies approximately one-half of the total depth DB of the console box 26 when the insert 28 sits on the floor 34 of the console box 26. In particular, the insert 28 preferably sits in the console box 26 such that a top edge of the insert 28 approximately abuts the walls 35, 36 and 37 of the console box 26. The insert 28 has a maximum width dimension W that substantially corresponds to a maximum width dimension WB of the console box 26 at the location where the top edge of the insert 28 approximately abuts the sidewalls 35 of the console box 26 when the insert 28 is disposed inside the storage compartment 30 of the console box 26. Similarly, the insert 28 has a maximum length dimension L that substantially corresponds to a maximum length dimension LB of the console box 26 at the location where the top edge of the insert 28 approximately abuts the forward and rearward walls 36 and 37 console box 26 when the insert 28 is disposed inside the storage compartment 30 of the console box 26. Therefore, the insert 28 is sized and dimensioned for a snug fit inside the storage compartment 30 of the console box 26 to prevent rattling during use.

Referring to FIG. 5, in the illustrated embodiment, the maximum width dimension W of the insert 28 ranges from 135 millimeters to 155 millimeters. More preferably, the maximum width dimension W of the insert 28 ranges from 140 millimeters to 150 millimeters. More preferably, the maximum width dimension W of the insert 28 is approximately 145 millimeters. As shown, the maximum width dimension W of the insert 28 is defined by a sum of a width dimension W1 of the first compartment 40 and a width dimension W2 of the second compartment 42. Therefore, in the illustrated embodiment, preferably the sum of the width dimension W1 of the first compartment 40 and the width dimension W2 of the second compartment 42 approximately corresponds to the maximum width dimension WB of the console box 26 at the location of the console box 26 where the second compartment 42 rests when the insert 28 is disposed in the storage compartment 30 the console box 26.

In the illustrated embodiment, the maximum length dimension L of the insert 28 ranges from 180 millimeters to 200 millimeters. More preferably, the maximum length dimension L of the insert 28 ranges from 185 millimeters to 195 millimeters. More preferably, the maximum length dimension L of the insert 28 is approximately 190 millimeters. It will be apparent to those skilled in the vehicle field from this disclosure that the maximum length L and width dimensions W of the insert 28 can vary depending on the overall length and width dimensions of the console box 26 and/or the center console 14.

The insert 28 is removably disposed in the storage compartment 30 of the console box 26. That is, as best seen in FIGS. 3 and 4, the user can store the insert 28 inside the storage compartment 30 such that the first compartment 40 is disposed closer to the driver's seat 16, or such that the second compartment 42 is disposed closer to the driver's seat 16 as desired. As shown, in the illustrated embodiment, the first compartment 40 is a larger compartment configured to be a pocket or a bin for the storage of larger items, such as tablets, computers, magazines, maps, etc. The second compartment 42 is less deep than the first compartment 40 and is configured as a tray that provides easy access to smaller items, such as cell phones, glasses, keys, cards, coins, etc.

As shown, the first and second compartments 40 and 42 are integrally molded to be a one-piece member. Preferably, the first and second compartments 40 and 42 are constructed of a rigid, lightweight material such as plastic and/or appropriate types of thermoplastic elastomers that are easily used in manufacturing by injection molding. For example, the first and second compartments 40 and 42 can be constructed of Versalloy™ thermoplastic elastomer. The first and second compartments 40 and 42 are integrally connected by a partition 44 of the insert 28 that forms a sidewall of both the first and second compartments 40 and 42. The partition 44 includes an aperture 46 to form a handle of the insert 28. The handle is formed by molding. Using the handle, the insert 28 can be easily removed from the console box 26 for cleaning the insert 28 and/or the console box 26. Also, the insert 28 can be used as a portable tray or storage bin.

As stated, the first compartment 40 is deeper with respect to the second compartment 42. Therefore, the first compartment 40 has the maximum depth D of the insert 28. Therefore, the first compartment 40 has a preferable maximum depth D1 of approximately 135 millimeters, as described above. As best seen in FIGS. 3 to 5, the first compartment 40 includes a sidewall 40A formed by the partition 44, another sidewall 40B, and a pair of end walls 40C extending between the two sidewalls 40A and 40B. The first compartment 40 also includes the bottommost panel P of the insert 28 that sits on the floor 34 of the console box 26. As stated, the maximum length dimension L of the insert 28 is approximately 190 millimeters in the illustrated embodiment. Therefore, the end walls 40C are separated by approximately 190 millimeters. Preferably, the width dimension W1 of the first compartment 40 is approximately 20 to 40 millimeters, measured as being the distance between the sidewalls 40A and 40B. More preferably, the width dimension W1 of the first compartment 40 measured as the distance between the sidewalls 40A and 40B is approximately 30 millimeters.

The second compartment 42 extends cantilevered from the partition 44 from a side of the partition 44 opposite respect to the first compartment 40. As stated, the second compartment 42 is configured to serve as a tray for the storage of smaller items. In the illustrated embodiment, the second compartment 42 has a depth D2 that is approximately 27 to 38 millimeters. More preferably, the depth D2 of the second compartment 42 is approximately 32 millimeters. As best seen in FIGS. 3 and 4, because the second compartment 42 is separated from the floor 34 of the console box 26 by a space S which can be used for storage of valuable items such as wallets, passports or money, etc. Therefore, second compartment 42 can form a false floor or a hidden floor for storing items.

The second compartment 42 has a sidewall 42A that is formed by the partition 44 and has another sidewall 42B. The sidewalls 42A and 42B are separated by a pair of end walls 42C. The second compartment 42 also includes a panel 42D for supporting objects. Thus, the second compartment 42 includes the panel 42D that is cantilevered from the sidewall 42A. Preferably, each of the end walls 42C are spaced from the sidewall by a cutout 50 to enable light into the insert 28 for easy viewing. In the illustrated embodiment, a width dimension W2 of the second compartment 42 as measured by a distance separating the sidewalls 42A and 42B is approximately 80 to 100 millimeters. More preferably, the width dimension W2 of the second compartment 42 is approximately 90 millimeters.

Preferably, the second compartment 42 includes a molded rubber mat 52 that is disposed over the panel 42D in a conventional manner to provide a textured surface to the panel 42D. In other words, the second compartment 42 includes a textured surface formed by molded rubber mat 52. The rubber mat 52 allows reduction in rattling noise from the objects stored in the insert 28 when the vehicle V is in motion. As shown, the rubber mat 52 has a pair of raised lips 54 at the cutouts 50 to prevent small objects from falling off. Additionally, an interior surface the bottommost panel P of the first compartment 40 can also have a molded rubber mat 52 to prevent rattling noise. Alternatively, the panel 42D of the second compartment 42 and the interior surface of the bottommost panel P of the first compartment 40 can be flocked with fabric, small fibers or carpet-like material to prevent rattling noise.

Figure 6:
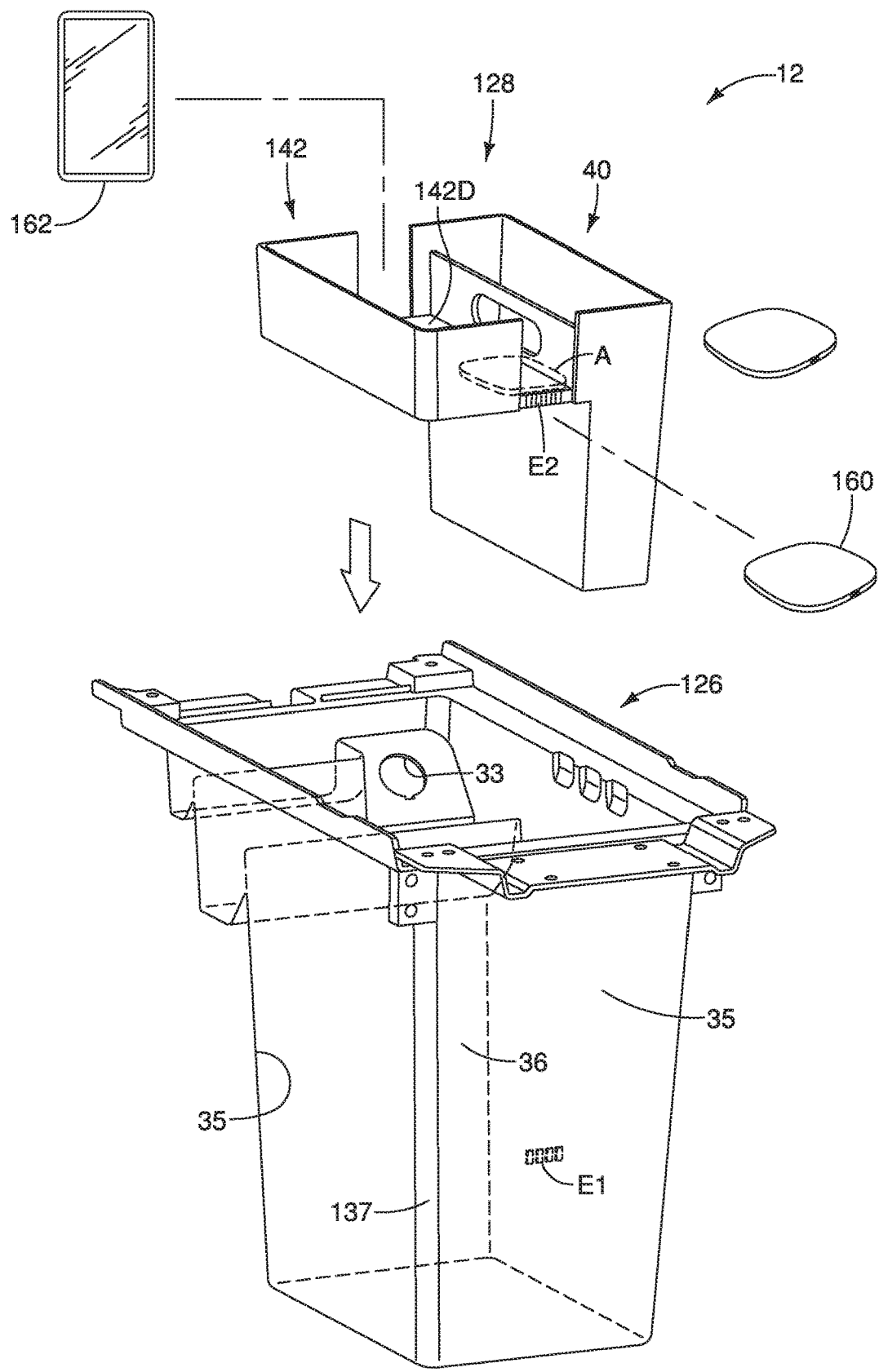
FIG. 6 is a perspective view of a modified console box and a modified insert that can be utilized with the center console illustrated in FIGS. 1 and 2.
Figure 7:
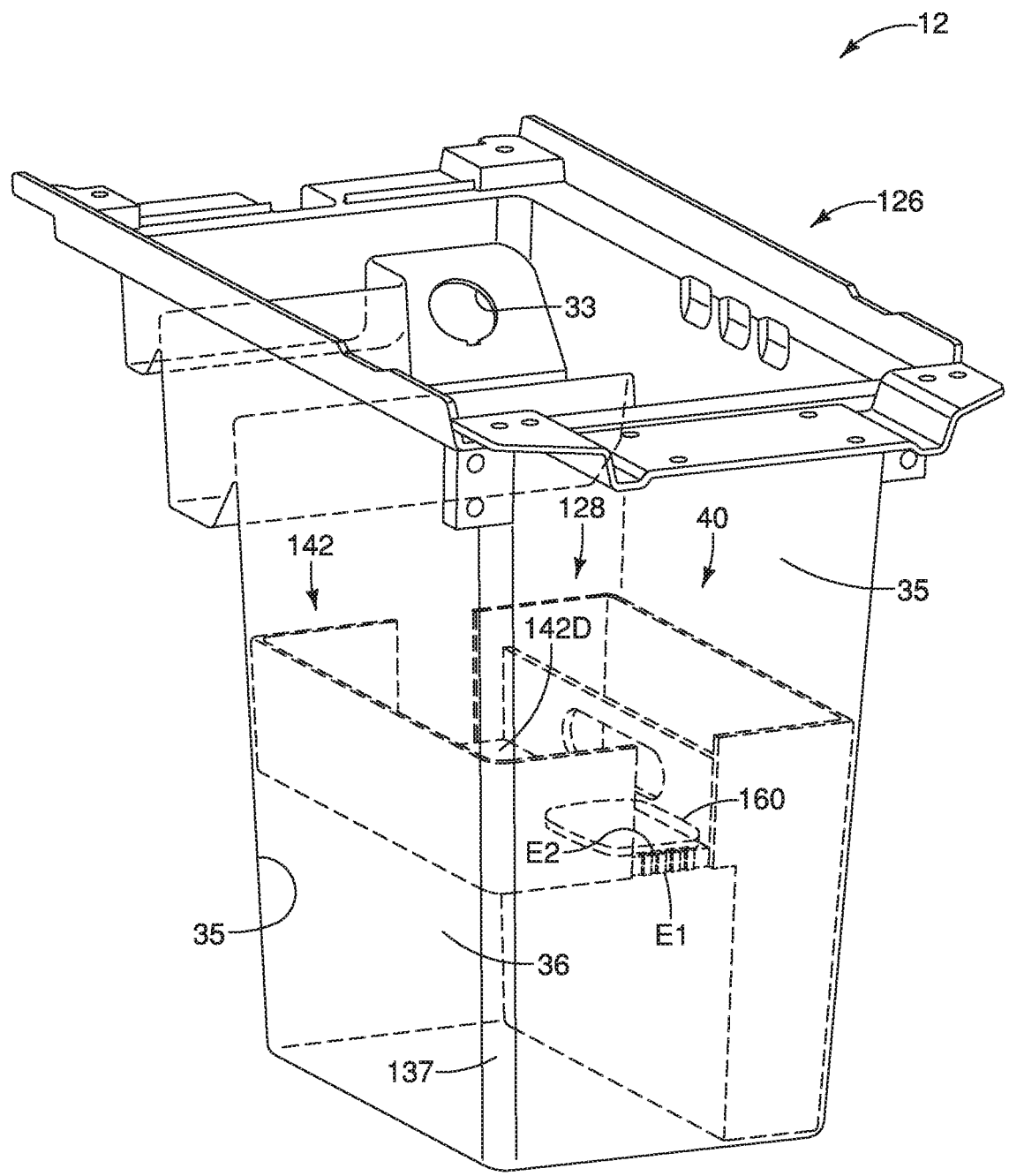
FIG. 7 is a perspective view of the modified console box with the modified disposed therein.

Referring now to FIGS. 5 and 6, a modified console box 126 and a modified insert 128 will be described. The modified console box 126 and the modified insert 128 can be implemented with the center console 14 described in the first illustrated embodiment. Thus, the vehicle console assembly 12 can include the modified console box 126 and the modified insert 128 as an alternative to the console box 26 and the insert 28 of the first illustrated embodiment. Due to the similarity between the modified console box 126 and the console box 26, and modified insert 128 and the insert 28, all corresponding components that are identical will receive the same reference numerals. All corresponding components that have been modified will receive the same reference numerals as the first illustrated embodiment but increased by 100.

The modified console box 126 is identical to the console box 26, except that the modified console box 126 includes an electrical connector E1 for supplying power to the modified insert 128. The modified console box 126 includes a pair of sidewalls 35 that separate a forward wall 36 and a rearward wall 137 that together define a storage compartment 30. In the illustrated embodiment, the electrical connector E1 is provided at an interior surface of one of the forward wall 36 and the rearward wall 137. As shown, the electrical connector E1 is provided at an interior surface of the rearward wall 137. However, it will be apparent to those skilled in the vehicle field from this disclosure that the electrical connector D1 can alternatively or also be provided at the forward wall 36 and/or at the sidewalls 35 as needed/or desired.

The modified insert 128 is identical to the insert 28 except that the modified insert 128 includes another electrical connector E2 that mates with the electrical connector E1 of the console box 126 to receive electric current transferred from the electrical connector E1. Preferably, the electrical connectors E1 and E2 are operatively disposed on the modified insert 128 and the modified console box 126 such that electrical connectors E1 and E2 connect when the insert 128 slides into the storage compartment 30.

The modified insert 128 includes a first compartment 40 that is identical to the first compartment 40 of the first illustrated embodiment, and a modified second compartment 142. The modified insert 128 further includes an inductor power transfer unit 160 for charging electronic devices stored in the insert 128, such as a mobile device 160. Thus, the vehicle console assembly 12 having the modified console box 126 and the modified insert 128 further comprises the inductor power transfer unit 160 that is implemented as part of the modified insert 128. In other words, the modified insert 128 is implemented with the inductor power transfer unit 160. The inductor power transfer unit 160 can be a wireless charger device. In particular, the inductor power transfer unit 160 can use an electromagnetic field to transfer energy to the mobile device 162 within the vicinity of the electromagnetic field to transfer power to the mobile device 162.

As shown, the modified second compartment 142 includes a modified panel 142D that is molded to include an interior compartment or a recess A in which the inductor power transfer unit 160 can be held. Thus, as shown, the inductor power transfer unit 160 is implemented as part of the modified second compartment 142. For example, the modified panel 142D can be topped with a textured surface such as a rubber mat 152 molded thereon. The inductor power transfer unit 160 can be stowed in the recess A underneath the rubber mat 152. In other words, the induction power transfer unit 160 is implemented underneath the textured surface of the modified second compartment 142.

The modified console box 126 includes an opening 33 for a power outlet that can be electrically connected to an ignition unit having a DC connector to supply electrical power (e.g., direct current power) for portable electrical accessories used in the vehicle V. The DC connector can transfer power from a power source, such as a vehicle battery that is electrically coupled to the vehicle ignition system such that operation of the vehicle ignition system provides electrical power to the inductor power transfer unit 160. The transfer of electrical power from the vehicle battery to the induction power transfer unit can be done automatically once the vehicle is turned on or can require a person to manually activate the inductor power transfer unit 160 to start the power transfer process. For further information on induction power transfer units in vehicle storage compartment 30s, see for example, U.S. Pat. No. 7,566,984.

GENERAL INTERPRETATION OF TERMS

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle console assembly. Accordingly, these terms, as utilized to describe the present invention should be interpreted relative to a vehicle equipped with the vehicle console assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle console assembly comprising:
a console box for a vehicle center console; and
an insert that is removably disposed in a storage compartment of the console box and having a bottommost panel that is supported on a bottommost panel of the console box, the insert includes a first compartment and a second compartment that are integrally attached to each other so that the first and second compartments are removably disposed in the storage compartment simultaneously, the first compartment having the maximum depth of the insert, the second compartment having a depth that is less than the maximum depth of the insert.

2. The vehicle console assembly according to claim 1, wherein
the insert has a maximum depth that is less than a maximum depth of the console box.

3. The vehicle console assembly according to claim 2, wherein
the insert has a maximum depth that is approximately one half a maximum depth of the console box.

4. The vehicle console assembly according to claim 1, wherein
the first and second compartments are integrally molded to be a one-piece member.

5. The vehicle console assembly according to claim 1, wherein
the first and second compartments are integrally connected by a partition of the insert that forms a sidewall of both the first and second compartments.

6. The vehicle console assembly according to claim 5, wherein
the partition includes an aperture to form a handle of the insert.

7. The vehicle console assembly according to claim 5, wherein
the second compartment has a panel that extends cantilevered from the sidewall.

8. The vehicle console assembly according to claim 1, wherein
the second compartment includes a textured panel formed by molded rubber.

9. The vehicle console assembly according to claim 1, wherein
an inductor power transfer unit implemented as part of the insert.

10. The vehicle console assembly according to claim 9, wherein
the second compartment includes an area for storing the inductor power transfer unit.

11. The vehicle console assembly according to claim 10, wherein
the console box includes an electrical connector that mates with another electrical connector of the second compartment to transfer electrical power to the inductor power transfer unit.

12. A vehicle console box insert configured to be removably disposed into a storage compartment of a vehicle console box, the insert comprising:
a first compartment and a second compartment, the first compartment having a maximum depth of the insert, the second compartment having a depth that is less than the maximum depth of the insert, the insert includes a first compartment and a second compartment that are integrally attached to each other so that the first and second compartments are configured to be removably disposed in the storage compartment simultaneously, the first compartment having the maximum depth of the insert, the second compartment having a depth that is less than the maximum depth of the insert.

13. The vehicle console box according to claim 12, wherein
the first and second compartments are integrally molded to be a one-piece member.

14. The vehicle console box according to claim 12, wherein
the first and second compartments are integrally connected by a partition of the insert that forms a sidewall of both the first and second compartments.

15. The vehicle console box according to claim 14, wherein
the partition includes an aperture to form a handle of the insert.

16. The vehicle console box according to claim 14, wherein
the second compartment has a panel that extends cantilevered from the sidewall.

17. The vehicle console box according to claim 16, wherein
the insert is implemented with an inductor power transfer unit.

18. The vehicle console box according to claim 17, wherein
the induction power transfer unit is implemented as part of the second compartment.

19. The vehicle console box according to claim 18, wherein
the induction power transfer unit is implemented underneath the textured panel of the second compartment.

* * * * *